W. WORKMAN & J. HITCHCOCK,

Said HITCHCOCK assignor to said WORKMAN.

Friction Block for Attaching Cultivator and other Teeth.

No. 9,638. Reissued April 5, 1881.

Attest:
J. Henry Kaiser.
J. A. Rutherford.

Inventors
William Workman
and
Jason Hitchcock,
By James L. Norris.
Att'y.

N. PETERS, PHOTO-LITHOGRAPHER, WASHINGTON, D. C.

UNITED STATES PATENT OFFICE.

WILLIAM WORKMAN, OF WEST DE PERE, AND JASON HITCHCOCK, OF RIPON, WISCONSIN; SAID HITCHCOCK ASSIGNOR TO SAID WORKMAN.

FRICTION-BLOCK FOR ATTACHING CULTIVATOR AND OTHER TEETH.

SPECIFICATION forming part of Reissued Letters Patent No. 9,638, dated April 5, 1881.

Original No. 110,103, dated December 13, 1870. Application for reissue filed November 22, 1880.

*To all whom it may concern:*

Be it known that we, WILLIAM WORKMAN, a citizen of the United States, formerly residing at Ripon, in the county of Fond du Lac and State of Wisconsin, but now a resident of West De Pere, in the county of Brown and State of Wisconsin, and JASON HITCHCOCK, a citizen of the United States, residing at Ripon, in the county of Fond du Lac and State of Wisconsin, have invented certain new and useful Improvements in Means of Attaching Cultivator and other Teeth, of which the following is a specification.

The object of this invention is to provide an improved means of connecting cultivator and other teeth or shovels with the drag-bars in such manner as to permit the teeth or shovels to slip if they meet an obstruction.

To this end our invention consists in a block attached to the drag-bar and confined in its adjusted position by friction, the block being provided with means for supporting the tooth-shank.

The invention further consists in the combination, with a drag-bar, of a block carrying the tooth-shank and confined in its adjusted position on the drag-bar by friction.

The invention further consists of certain other combinations and constructions of parts, which will be hereinafter pointed out in the claims.

Figure 1:
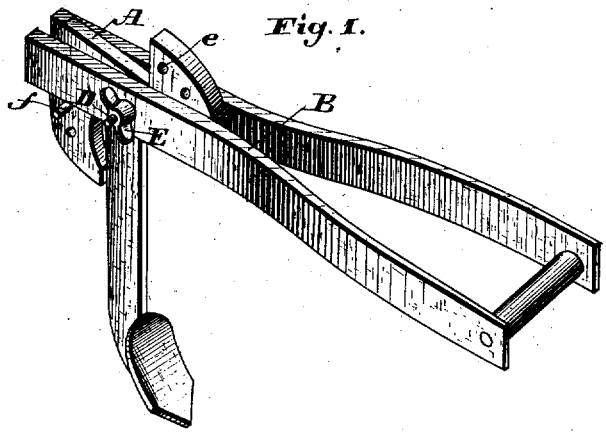
Figure 2:
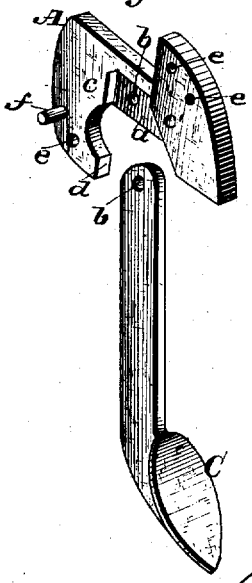

In the accompanying drawings, illustrating the mode of carrying out our invention, Figure 1 represents a perspective view of a suitable drag-bar with our improvements applied thereto, and Fig. 2 represents a detached perspective view of the friction-block and tooth or shovel.

In the drawings, the letter A indicates a friction-block, consisting of a comparatively thin vertical plate, which is clamped in the slotted or divided end of the ordinary drag-bar B of a seeding-machine. The friction-block is provided with a socket, *a*, intermediate its ends, in which is arranged the upper end of the shank of a cultivator or other tooth or shovel, C, said friction-block having perforations *b*, through which and the drag-bar passes the transverse bolt D, which is screw-threaded at one end, on which is arranged a binding-nut, E, for the purpose of confining all in proper position. The recess in the friction-block forms the two shoulders *c c'*, against which the tooth-shank is adapted to rest when moved forward or backward. The rear portion of the friction-block is extended to form a shoulder, *d*, against which the shank bears to sustain the strain in the forward movement of the tooth or shovel through the ground.

In operation the block A is confined in position on the drag-bar solely by friction due to the binding action of the bolt and nut, and said block can readily be adjusted to any position for regulating the angle or set of the tooth or shovel. In the forward movement of the tooth or shovel its shank bears against the shoulder *d* which sustains the strain, and in turning or backing the removal of strain permits the drag-bar to fall to an extent equal to the movement of the shank in the socket of the friction-block. This is of especial advantage in "backing up," as the teeth or shovels are capable of a slight movement by the back action, and hence lose their rigidity.

By the provision of a block confined in place by friction and carrying the shank of the tooth or shovel, it will be manifest that if the tooth or shovel should come in contact with an obstruction of a rigid nature in the soil the tooth or shovel will yield by reason of the friction-block yielding on the drag-bar, and thus any fracture of the working parts is wholly prevented.

As a supplemental means of confining the friction-plate in place, should the bolt and binding-nut become injured or loose by continual usage, we provide the end portions of the friction-block with the perforations *e*, through which can be passed suitable pins *f*.

In practice the friction-block can be confined in position at the outside of the drag-bar; but we prefer to clamp it in position within the slotted drag, as such is more effective in operation.

It will be observed that the tooth or shovel shank is made separate from the friction-block, and for this reason the block can be made of cast-iron, and if either part becomes broken or injured it can be readily replaced with another.

The shanks of cultivator-teeth have heretofore been clamped within a slotted drag-bar by a transverse bolt; but it has been found that such is impracticable and inefficient in operation, because it is impossible to secure sufficient friction from the shank itself to provide for the proper working of the parts. This lack of frictional surface in such class of inventions has, to a small extent, been overcome by a forked shank, one arm of the fork being secured in the forward end of the slot in the drag-bar, and the other arm of said fork being arranged within the rear end of said slot and clamped in place by a transverse bolt and nut, which bolt, however, is disconnected from and affords no support to this arm of the fork. In this manner a certain leverage between the tooth-shank and drag-bar is provided; but the construction is very objectionable, because of the lack of frictional surface between the drag-bar and the branching arm, and, further, because this arm has to be welded to the tooth-shank, thereby increasing the cost of the machine; besides which it is essential to provide two transverse bolts in the drag-bar for holding one arm of the forked shank, and the other for effecting the clamping action. A further objection is that the drag-bar must necessarily be made much longer to accommodate the forked shank. All these objections are overcome by our invention, and the devices are rendered very effective in use and exceedingly inexpensive to manufacture.

Having thus described our invention, what we claim is—

1. As an improvement in connecting cultivator and other slip teeth to drag-bars, the block attached to the drag-bar and confined in its adjusted position by friction, said block being provided with means for supporting the tooth-shank, substantially as described.

2. The combination, with the drag-bar, of the block carrying the tooth-shank and confined in its adjusted position on the drag-bar by friction, substantially as described.

3. In combination with a drag-bar, the block attached to the drag-bar and provided with means for supporting a tooth-shank constructed separately from the block and arranged at one side thereof, substantially as described.

4. A friction-block attached to a drag-bar and adapted to be adjusted at different angles, in combination with a tooth-shank connected with the friction-block and adapted to have a movement independent of the friction-block, substantially as described.

5. The friction-block provided with the intermediate socket, *a*, and shoulders *c c'*, in combination with a tooth or shovel having a shank fitted in said socket, substantially as described.

In testimony whereof we have hereunto set our hands in the presence of two witnesses.

WILLIAM WORKMAN.
JASON HITCHCOCK.

Witnesses:
H. E. GIESE,
THOS. HARRIS.